United States Patent
He et al.

(10) Patent No.: US 11,209,879 B2
(45) Date of Patent: Dec. 28, 2021

(54) METHOD AND APPARATUS FOR ADJUSTING A WORKLOAD TO PERFORM POWER MANAGEMENT TO EXTEND BATTERY CYCLE LIFE

(71) Applicant: DELL PRODUCTS, LP, Round Rock, TX (US)

(72) Inventors: Qinghong He, Austin, TX (US); Yan Ning, Cedar Park, TX (US); John Robert Lerma, Cedar Park, TX (US); Louis M. Davis, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 16/458,422

(22) Filed: Jul. 1, 2019

(65) Prior Publication Data

US 2021/0004066 A1 Jan. 7, 2021

(51) Int. Cl.
*G06F 1/20* (2006.01)
*G06F 1/329* (2019.01)
*G06F 1/3212* (2019.01)

(52) U.S. Cl.
CPC .............. *G06F 1/206* (2013.01); *G06F 1/329* (2013.01); *G06F 1/3212* (2013.01)

(58) Field of Classification Search
CPC ......... G06F 1/206; G06F 1/3212; G06F 1/329
USPC ....................................................... 713/320
See application file for complete search history.

(56) References Cited

U.S. PATENT DOCUMENTS

| | | | |
|---|---|---|---|
| 6,948,078 B2 * | 9/2005 | Odaohhara | G06F 1/26 713/300 |
| 7,518,340 B2 | 4/2009 | Sterz et al. | |
| 8,433,938 B2 * | 4/2013 | Cha | G06F 1/324 713/322 |
| 9,753,094 B2 | 9/2017 | Thompson et al. | |
| 2002/0079866 A1 * | 6/2002 | Odaohhara | H02J 7/0091 320/150 |
| 2002/0093311 A1 * | 7/2002 | Stryker | G06F 1/206 320/135 |
| 2002/0167294 A1 * | 11/2002 | Odaohhara | H02J 7/0029 320/132 |
| 2003/0167415 A1 * | 9/2003 | Odaohhara | G06F 1/263 713/340 |
| 2005/0022039 A1 * | 1/2005 | Inui | G06F 1/3203 713/300 |
| 2016/0097820 A1 | 4/2016 | Thompson et al. | |
| 2017/0177044 A1 * | 6/2017 | Limaye | G06F 1/203 |
| 2018/0373308 A1 | 12/2018 | Sultenfuss et al. | |

* cited by examiner

*Primary Examiner* — Chun Cao
(74) *Attorney, Agent, or Firm* — Larson Newman, LLP

(57) ABSTRACT

An information handling system includes a processor, an embedded controller (EC) and a battery system. The EC sends a request to the processor based upon a temperature of the battery system. The request includes power limit recommendation that is received by the processor. The processor adjusts a workload based upon the received power limit recommendation from the EC. The adjustment in the workload may correspond to a decrease in discharging rates of the battery system.

18 Claims, 6 Drawing Sheets

400

| Battery Capacity Range 410 | First Limit 420 | Average Discharging Rate 430 | Second Limit 440 | Temperature Threshold Limit 450 |
|---|---|---|---|---|
| 90%-100% 411 | 60°C 421 | >1C 431 | -5°C 441 | 55°C 451 |
| | | .5 - 1.0C 432 | -2°C 442 | 58°C 452 |
| | | <0.5C 433 | 0°C 443 | 60°C 453 |
| 80%-89% 414 | 55°C 424 | >1C 434 | -5°C 444 | 50°C 454 |
| | | .5 - 1.0C 435 | -2°C 445 | 53°C 455 |
| | | <0.5C 436 | 0°C 446 | 55°C 456 |
| <80% 417 | 50°C 427 | >1C 437 | -5°C 447 | 45°C 457 |
| | | .5 - 1.0C 438 | -2°C 448 | 48°C 458 |
| | | <0.5C 439 | 0°C 449 | 50°C 459 |

*FIG. 4*

METHOD AND APPARATUS FOR ADJUSTING A WORKLOAD TO PERFORM POWER MANAGEMENT TO EXTEND BATTERY CYCLE LIFE

FIELD OF THE DISCLOSURE

This disclosure generally relates to information handling systems, and more particularly relates to improving power management to extend battery cycle life and system operating temperature range.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a processor, an embedded controller (EC) and a battery system. The EC sends a request to the processor based upon a temperature of the battery system. The processor adjusts a workload based upon the request from the EC.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4 is a look-up table that is used in a system power management to calculate a battery system temperature threshold limit, according to an embodiment of the present disclosure;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
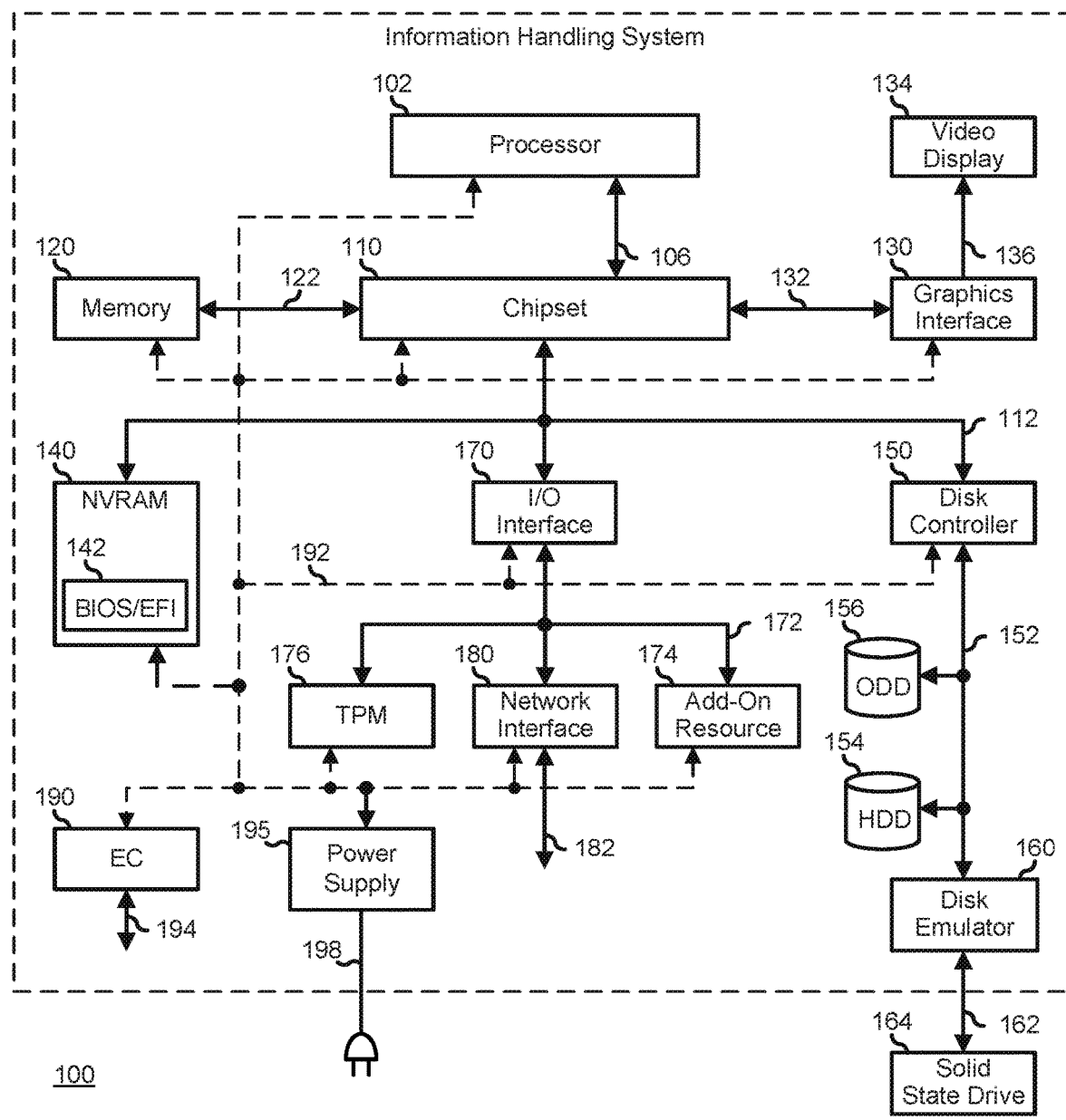
FIG. 1 is a block diagram of an information handling system, according to an embodiment of the present disclosure.

FIG. 1 illustrates an embodiment of an information handling system 100 including a processor 102, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, an embedded controller (EC) 190, and a power supply 195 with a plug chord 198. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

EC 190 represents one or more processing devices, such as a dedicated Baseboard Management Controller (BMC) System-on-a-Chip (SoC) device, one or more associated memory devices, one or more network interface devices, and the like, that operate together to provide the management environment for information handling system 100. In particular, EC 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. EC 190 can include a network connection to an external management system, and the EC can report status information for information handling system 100, receive BIOS/UEFI or system firmware updates, or other control information for managing and controlling the operation of the information handling system. EC 190 can operate off of a separate power plane from the components of the host environment so that the EC receives power to manage information handling system 100 when the information handling system is otherwise shut down. An example of the EC 190 includes a commercially available BMC product that operates in accordance with an Intelligent Platform Management Initiative (IPMI) specification, such as a Integrated Dell Remote Access Controller (iDRAC), or the like.

In an embodiment, the EC 190 implements the iDRAC that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, EC 190 includes a network interface 194 that can be connected to a remote management system to receive firmware updates, as needed or desired. Here EC 190 receives the firmware updates, stores the updates to a data storage device associated with the EC, transfers the firmware updates to NV-RAM of the device or system that is the subject of the firmware update, thereby replacing the currently operating firmware associated with the device or system, and reboots information handling system, whereupon the device or system utilizes the updated firmware image.

EC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with EC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

Power supply 195 may include hardware circuitry that provides a source of electrical energy to the information handling system. The power supply includes an alternating current to direct current (AC/DC) converter and a battery system that can supply the electrical energy to support, for example, a system load in the information handling system. In this example, the supporting of the system load includes providing of the biasing voltages to the processor 102, graphics interface 130, universal serial bus drive, display screen, and other information handling system component that may require electrical energy for its operation. For a particular system load such as a processor workload, the processor 102 may reduce power usage in order to maintain battery temperature as described below.

Figure 2:
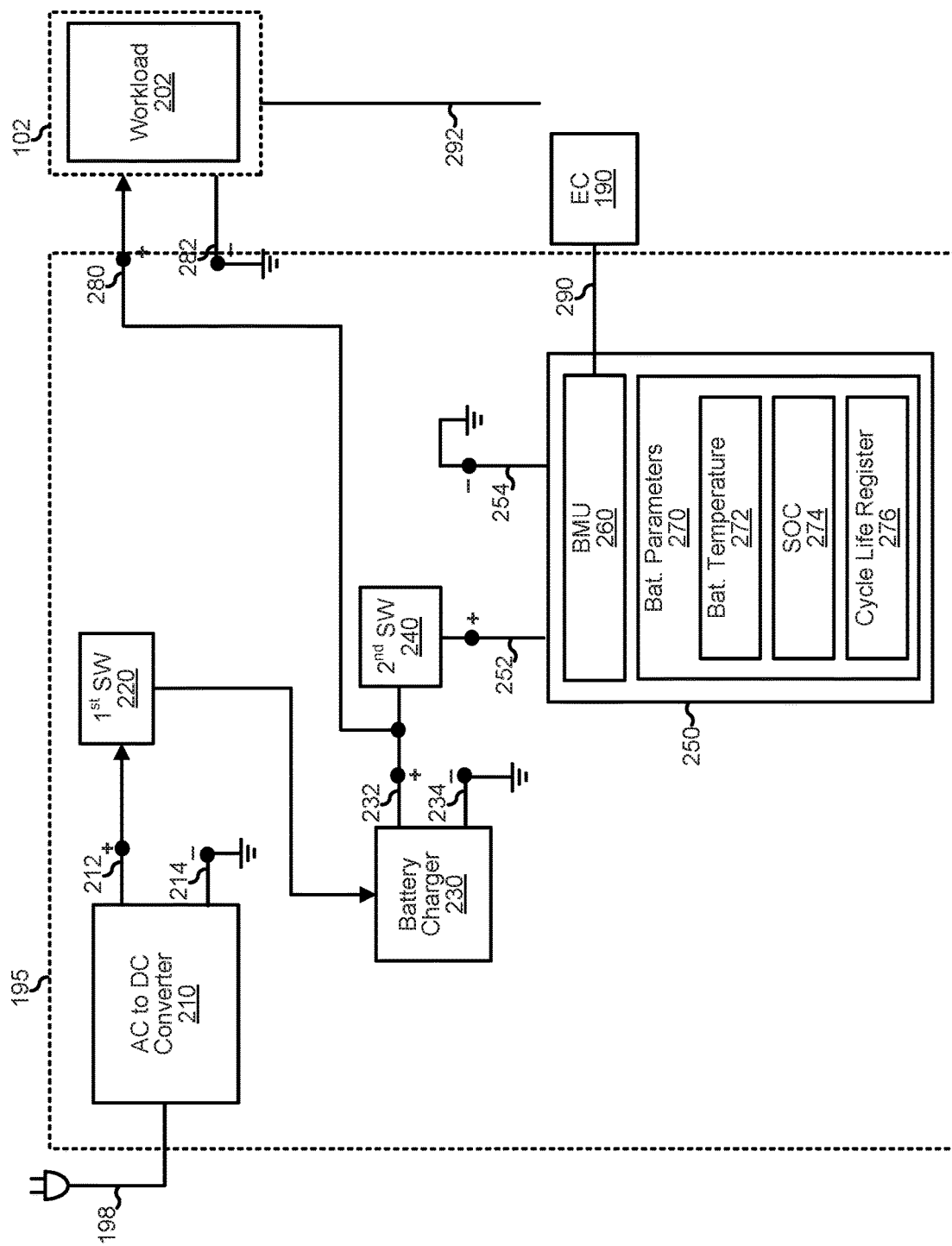
FIG. 2 is a block diagram of a portion of the information handling system configured to improve power management, according to an embodiment of the present disclosure.

FIG. 2 is a block diagram of a portion 200 of the information handling system. The portion 200 includes the power supply 195, the processor 102 with a workload 202, and the EC 190. The power supply 195 includes an AC/DC converter 210 having a positive terminal 212 and a negative terminal 214, a first switch 220, a battery charger 230 with a positive ground 232 and a negative terminal 234, a second switch 240, and a battery system 250 having a positive terminal 252 and a negative terminal 254. The battery system 250 includes a battery management unit (BMU) 260 and battery parameters 270 with a battery temperature register 272, a state of charge (SOC) register 274, and a cycle life register 276. The battery system 250 may supply electrical energy to the processor 102 having a positive terminal 280 and a negative terminal 282. The BMU 260 and the processor 102 are in physical communication with the EC 190 over a first signal link 290 and a second signal link 292, respectively. The EC 190 may use the first signal link 290 to receive the battery parameters from the BMU 260 while the processor 102 may adjust amount of the workload 202 based upon a power limit recommendation received over the second signal link 292. The power limit recommendation may include a request to adjust power consumption in the workload 202. In an embodiment, the adjustments in the workload 202 may generate corresponding changes in the power drawn by the processor 102. The changes in the power drawn by the processor 102 may correspond to adjustments in discharging rate of the battery system 250. In this regard, the discharging rate of the battery system 250 may be indirectly adjusted by the EC 190 based on the received battery parameters for example. The received battery parameters may include battery temperature from the battery temperature register 272, battery capacity from the SOC register 274, battery cycles from the cycle life register 276, or a combination thereof.

The information handling system may draw electrical energy through the AC/DC converter 210 or through the battery system 250 of the power supply 195. For example, the processor 102 may receive the biasing voltages from the AC/DC converter 210 that converts an external AC power supply into DC voltages. In this example, the AC/DC converter 210 may supply the DC voltages to the positive terminal 280 of the processor 102 through the first switch 220 and the battery charger 230. In another example, the battery system 250 may support the AC/DC converter 210 when the power consumption required by the workload 202 is higher than what the AC/DC converter can supply. In another example, the processor 102 can receive the biasing voltages from the battery system 250 through the second switch 240. When the battery system 250 is supplying alone the biasing voltages to the processor 102, the first switch 220 can be used to disconnect the AC/DC converter 210 from the battery charger 230. In some cases, the first switch 220 can be turned ON so that internal resistances of the AC/DC converter 210 can be used as a dummy load that may draw power and thereby affects the discharging rate of the battery system 250.

The BMU 260 includes a hardware circuitry that can perform tasks related to management of the power supply 195. The BMU 260 may include data storage and an internal processor that can execute code instructions to monitor the battery parameters 270. With the monitored battery parameters, the BMU 260 may send this information to the EC 190 for further processing. For example, the BMU 260 may send current battery temperature, present charge capacity, and approximate battery cycle life stage to the EC 190. The BMU 260 may read this information from the battery temperature register 272, SOC register 274, and cycle life register 276, respectively. In this example, the EC 190 may be configured to compare the read battery temperature to a battery system temperature threshold limit. In another example, the BMU 260 may be configured to compare the ead battery temperature to the battery system temperature threshold limit, and sends comparison results to the EC 190. In these examples, an over temperature may result when the read battery temperature exceeds the battery system temperature threshold limit.

The workload 202 may represent an amount of computational work or tasks that the processor performs. In multi-core processors, the workload 202 may include usage rates during non-idle periods on each core. The usage rates can be based from an amount of time that the core is used to process instructions as opposed to elapsed time when the core is in idle mode. In other cases, the workload 202 may represent the power consumption by information handling system components such as video display, sound device, and the like.

The processor 102 may send workload information to the EC 190 over the second signal link 292. In response to receiving of the workload information and the battery parameters, the EC 190 may use a look-up table to generate the battery system temperature threshold limit. When the EC 190 determines over temperature or receives this information from the BMU 260, the EC may send the power limit recommendation to the processor 102. In response to receiving of the power limit recommendation, the processor 102 may adjusts present amount of usage rates in the workload 202. In an embodiment, the power limit recommendation may be based upon the battery temperature, battery state of charge, battery cycles, or a combination thereof. In this embodiment, the EC 190 may indirectly adjust the discharging rates of the battery system 250 based upon the adjustments in the workload 202 in the processor 102.

Battery temperature register 270 may store measured degree of heat in the battery system 250. For example, a hardware circuit sensor may be utilized to detect and measure the present temperature of the battery system 250. In this example, the measured temperature can be stored in the battery temperature register 270. The SOC register 274 may store present voltage charge level of the battery system that. For example, the voltage charge level has a range of 0% to 100% with the 100% being maximum voltage charge level. The cycle life counter 276 includes a hardware circuit register that stores number of times that a rechargeable battery has been charged and discharged to an amount that is equal to battery's capacity.

When the battery system 250 is supplying the biasing voltages to support the workload 102 of the processor 102, the EC 190 may receive the battery parameters 270 from the BMU 260. For example, BMU 260 sends to the EC 190 the battery parameters 270 every ten seconds period. The EC 190 may similarly receive the amount of workload from the processor 102 on this frequency of every ten seconds period. Further information on the details of the BMU, battery system, and battery charging operations may be found in U.S. Pat. Nos. 10,116,012, 7,378,819, and 7,391,184, each of which is incorporated herein by reference in its entirety.

Figure 3:
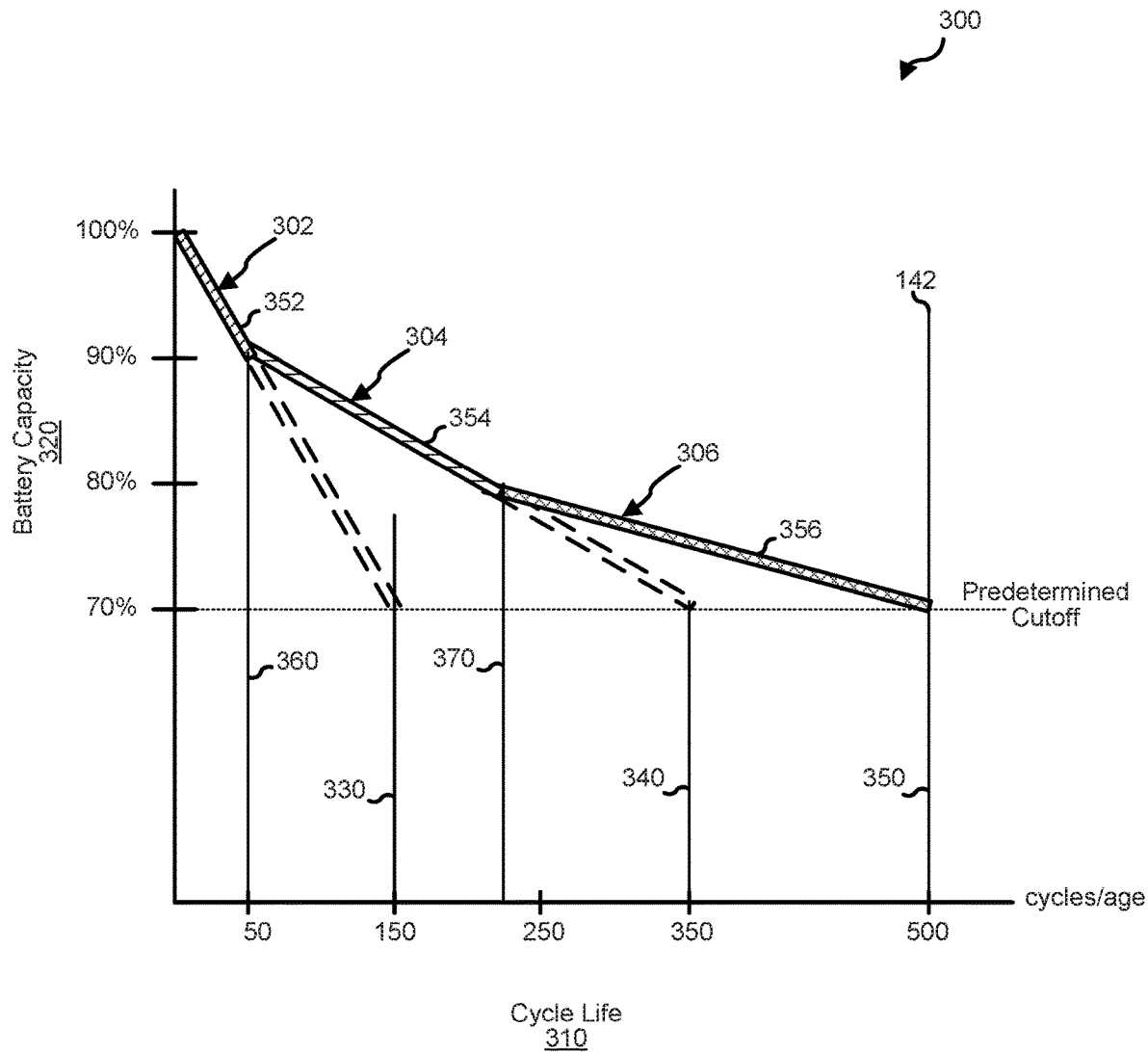
FIG. 3 is a graph of an extended battery cycle life, according to an embodiment of the present disclosure.

FIG. 3 is a graph 300 of an extended cycle life of the battery system when the battery discharging rates are controlled to operate at different battery system temperatures. The graph 300 includes a first discharging rate 302, a second discharging rate 304, a third discharging rate 306, a cycle life 310 representing graph's horizontal axis, a battery capacity 320 representing graph's vertical axis, a first cycle life limit 330, a second cycle life limit 340, and a third cycle life limit 350. The graph 300 also includes a first battery system temperature threshold limit 352, a second battery system temperature threshold limit 354, a third battery system temperature threshold limit 356, a first battery discharging rate transition 360, and a second battery discharging rate transition 370.

As an overview of the graph 300, the battery system 250 that uses the first discharging rate 302 at the first battery system temperature threshold limit 352 can have a limited battery life of up to the first cycle life limit 330 if it does not transition into the second discharging rate 304 when the battery cycle life reaches the first battery discharging rate transition 360. The battery system that transitions from the first discharging rate 302 to the second discharging rate 304 at the second battery system temperature threshold limit 354 can have a limited battery life of up to the second cycle life limit 340 if it does not shift to the third discharging rate 306 when the battery cycle life reaches the second battery discharging rate transition 370. The battery system that uses the third discharging rate 306 at the third battery system temperature threshold limit 356 can have the extended battery life of up to the third cycle life limit 350 when the battery system utilizes the first battery discharging rate transition 360 and the second battery discharging rate transition 370 to dynamically adjust its discharging rates and the corresponding battery system temperature threshold limit. The number of cycles presented by the graph 300 for the first cycle life limit 330, second cycle life limit 340, third cycle life limit 350, first battery discharging rate transition 360, and the second battery discharging rate transition 370 are mere examples and may vary for different battery chemistry and configurations.

The first battery system temperature threshold limit 352 includes an initial temperature threshold limit that is used by the EC 190 to extend the battery cycle life. The initial temperature threshold limit can include a particular value that is higher than the second battery system temperature threshold limit 354 or the third battery system temperature threshold limit 356. In this sense, the initial temperature threshold limit requires a higher discharging rate as compared to the second discharging rate 304 or the third discharging rate 306 of the second and third battery system temperature threshold limits, respectively. In an embodiment, the first battery system temperature threshold limit 352 can be derived using a reference discharging rate and or based from a measured average battery system temperature over a particular period. The reference discharging rate can include, for example, a battery rating capacity (C) of 1.0C while the measured average battery system temperature may include a mean battery temperature within a period of ten seconds. In this example, the initial or the first battery system temperature threshold limit 352 of about 60° C. can be derived. The 60° C. first temperature threshold limit can include the highest operating temperature of the battery system in its early stage of battery life. The early stage, for example, starts at zero cycle and up to about fifty cycles. At this 60° C. temperature, the battery system can operate, for example, at discharging rate that is greater than 1.0 C such as 1.5C. It is noted, however, that when the EC 190 allows the battery system to continuously operate at high temperature of 60° C. and 1.5C first discharging rate, the battery system will have a predetermined cutoff of about 150 cycles corresponding to battery capacity of 70%. The predetermined cutoff includes an extent of useful usage of the battery system when continuously operated at a particular temperature and discharging rate.

The second battery system temperature threshold limit 354 can include a lower temperature threshold limit that replaces the initial temperature threshold limit when the battery cycle life reaches the first battery discharging rate transition 360. The second battery system temperature threshold limit 354 replaces the first temperature threshold limit 352 in order to extend the battery life of up to the second cycle life limit 340. The second battery system temperature threshold limit 354 can include values that are in between the first battery system temperature threshold limit 352 and the third battery system temperature threshold limit 356. In this sense, the second battery system temperature threshold limit 354 requires a lower discharging rate than the first discharging rate corresponding to the first battery system temperature threshold limit 352 but may have a higher discharging rate compared to the third discharging rate of the third battery system temperature threshold limit 356. Similarly, the second battery system temperature threshold limit 354 can be derived using the reference discharging rate of 1.0C rating capacity and or a measured average battery system temperature over a particular period. For example, the measured average battery system temperature may include a mean battery temperature within a period of ten seconds. In this example, the battery system second temperature threshold limit 354 of about 55° C. can be derived. The 55° C. second temperature threshold limit can include the highest operating temperature of the battery system when the battery system cycle life include values that are in between the first battery discharging rate transition 360 and the second cycle limit 340. At this temperature, the battery system can operate at 1C discharging rate. However, when the EC 190 allows the battery system to continuously operate at 55° C. temperature and at 1C second discharging rate, the battery system will have a predetermined cutoff of about 350 cycles corresponding to battery capacity of 70%. Accordingly, the EC 190 facilitates transitioning of the temperature threshold limit at around 220 cycles or during the second battery discharging rate transition 370 in order to extend the battery life of up to the third cycle limit 350.

In order to extend the battery life of up to the third cycle life limit 350, the EC 190 facilitates transitioning of the discharging rate from the second battery system temperature threshold limit 354 to the third battery system temperature threshold limit 356 when the battery system cycle reaches the second battery discharging rate transition 370. The third battery system temperature threshold limit 356 replaces the second battery system temperature threshold limit 354 in order to extend the battery life of up to the third cycle life limit 350. The third battery system temperature threshold limit 356 can have lower temperature threshold limit as compared to the first battery system temperature threshold limit 352 or the second battery system temperature threshold limit 354. In this sense, the third battery system temperature threshold limit 356 requires a lower discharging rate than the first discharging rate 302 and the second discharging rate 304 of the first battery system temperature threshold limit 352 and the second battery system temperature threshold limit 354, respectively. Similarly, the third battery system temperature threshold limit 356 can be derived using a reference discharging rate and a measured average battery system temperature over a particular period. The reference discharge rage can include, for example, a battery rating capacity of 1.0C while the measured average battery system temperature may include a mean battery temperature within a period of ten seconds. In this example, the third temperature threshold limit of about 50° C. can be derived. The 50° C. third temperature threshold limit can include the highest operating temperature of the battery system 250 when the battery system cycle life is between the second battery discharging rate transition 370 and the third cycle limit 350. At this temperature, the battery system can have a predetermined cutoff of about 500 cycles corresponding to battery capacity of 70%.

The first battery discharging rate transition 360 includes a period in the battery system cycle life when the initial use of the battery system temperature threshold limit 352 is shifted to the second battery system temperature threshold limit 354. The first battery discharging rate transition 360 can cover a cycle life range of about 0 to 50 cycles or between 91% to 100% battery capacities. Although the battery system can be operated below 90% battery capacity or at cycle life of more than 50 using the initial battery system temperature threshold limit 352, the use of the cycle life range of about 0-50 cycles can provide optimized operation of the battery system to extend its battery life of up to the second cycle limit 340. In this case, the EC 190 can use the 0-50 cycles range to maximize discharging rates for maximum system loading.

The second battery discharging rate transition 370 includes a transition period when the use of the second battery system temperature threshold limit 354 is shifted to the third battery system temperature threshold limit 356. The second battery discharging rate transition 370 can include a cycle life range of about 51 to 220 cycles or about 81% to 90% battery capacities. Although the battery system can be operated below 80% battery capacity using the second discharging rate 304, the use of the cycle life range of about 51 to 220 cycles can provide optimized operation of the battery system to extend its battery life of up to the third cycle limit 350, which is about 350 cycles. In this case, the EC 190 limits the use of the second discharging rate 304 to 51 to 220 cycles range in order for the battery life to reach the 500 cycles.

The cycle limit corresponding to each discharging rate may include the predetermined cutoff of the battery system when it is operated at a particular temperature threshold limit and discharging rate. For example, the first cycle limit 330 includes the extent of useful operation of the battery system when it is operated using the first battery system temperature threshold limit and at the first discharging rate. In another example, the second cycle limit 340 includes the extent of useful life of the battery system when it is operated using the second battery system temperature threshold limit and at the second discharging rate. In another example, the third cycle limit 350 includes the extent of useful operation of the battery system when it is operated using the third battery system temperature threshold limit and at the third discharging rate. In an embodiment, the EC 190 utilizes the first battery discharging rate transition 360 to extend the battery life from the first cycle limit 330 to second cycle limit 340. Furthermore, the EC 190 utilizes the second battery discharging rate transition 370 to extend the battery life from the second cycle limit 340 to third cycle limit or about 500 cycles.

FIG. 4 is a look-up table 400 that can be used to generate the battery system temperature threshold limit. The look-up table 400 includes a battery capacity range 410, a first limit 420, an average discharging rate 430, a second limit 440, and a battery system temperature threshold limit 450.

The battery capacity range 410 may include a range of voltage charges that can be used to identify remaining capacity, for example, of the battery system 250. For example, the battery capacity range 410 includes a first range 411 having a configured range of 90%-100%, a second range 414 having a configured range of 80% to 89%, and a third range 417 having a configured range of less than 80%. Different other ranges may be configured for the first, second, and third ranges without affecting the embodiment described herein. For example, the first range 411 is 95% to 100% while the second range 414 is 91% to 94%.

The first limit 420 includes a preconfigured reference value that can be added to the second limit 440 in order to generate the battery system threshold limit 450. For example, the first limit 420 includes a first reference value 421 of 60° C. within the first range 411 of 90%-100%. In this example, the first reference value 421 can be based upon a reference discharge rate such as, for example, a battery rating capacity (C) of 1.0C. In another example, the first limit 420 includes a second reference value 424 of 55° C. within the second range of 80%-89%. Similarly, the second reference 424 can be based upon a reference discharge rate such as, for example, the battery rating capacity of 1.0C. Different other amounts of first reference value 421, second reference value 424, and third reference value 427 may be configured in the look-up table 400 as the first limit 420.

The average discharging rate 430 may include a mean of battery discharging rates within a particular time period. After the calculation of the mean between a first discharging rate and a second discharging rate within a time period, a first average 431 identifies a first average range for the calculated mean. For example, the first average 431 includes the calculated mean that are above 1C. At another particular time period, a second average 432 may similarly identify a second average range for the calculated mean, and so on. The first discharging rate and the second discharging rate are similar to the discharging rates 302, 304, and 306 as described in FIG. 3.

The second limit 440 includes a preconfigured equivalent value for a particular amount of the average discharging rate 430 where the preconfigured equivalent value is added to the first limit 420 to generate the battery temperature threshold limit 450. For example, a first equivalent value 441 of −5° C. may be configured for the first average 431 having an average discharging rate range that is greater than 1C. In another example, a second equivalent value 442 of −2° C. may be configured for the second average 432 having an average discharging rate range that is between 0.5C to 1.0C, and so on. In these examples, each of the first equivalent value 441, second equivalent value 442, and third equivalent value 443 is added to the first reference value 421 of 60° C. to generate corresponding first battery temperature threshold limit 451, second battery temperature threshold limit 452, and third battery temperature threshold limit 453.

For example, the first battery temperature threshold limit 451 can be derived by adding the −5° C. first equivalent value 441 to the 60° C. first reference value 421. In this example, the first battery temperature threshold limit 451 may include a target limit of about 55° C. In another example, the second battery temperature threshold limit 452 can be derived by adding the −2° C. second equivalent value 442 to the 60° C. first reference value 421. In this other example, the second battery temperature threshold limit 452 may include a target limit of about 58° C., and so on.

The EC 190 can use the look-up table 400 to determine presence of over temperature in the battery system 250. For example, the BMU 260 reads the battery temperature from the battery temperature register 272. In this example, the EC 190 compares the read battery temperature to the corresponding battery temperature threshold limit 450. In the case where the read battery temperature exceeds the corresponding value of the battery temperature threshold limit, the EC 190 may send the power limit recommendation to the processor 102 to adjust the workload 202 accordingly. In other embodiments, the EC 190 may send the power limit recommendations to other components that form part of the system load.

The calculation of the battery temperature threshold limit 450 for the second range 414 is similar to the described operation in the first range 411 although different amounts of the first limit 420 and the second limit 440 can by utilized in the look-up table 400. For example and for the second reference value 424 of 55° C., a fourth battery temperature threshold limit 454 can be derived adding the −5° C. fourth equivalent value 444 to the 55° C. second reference value 424. In this example, the fourth battery temperature threshold limit 454 can have a value of 50° C. when a fourth average 434 includes an average discharging rate that is greater than 1C.

Figure 5:
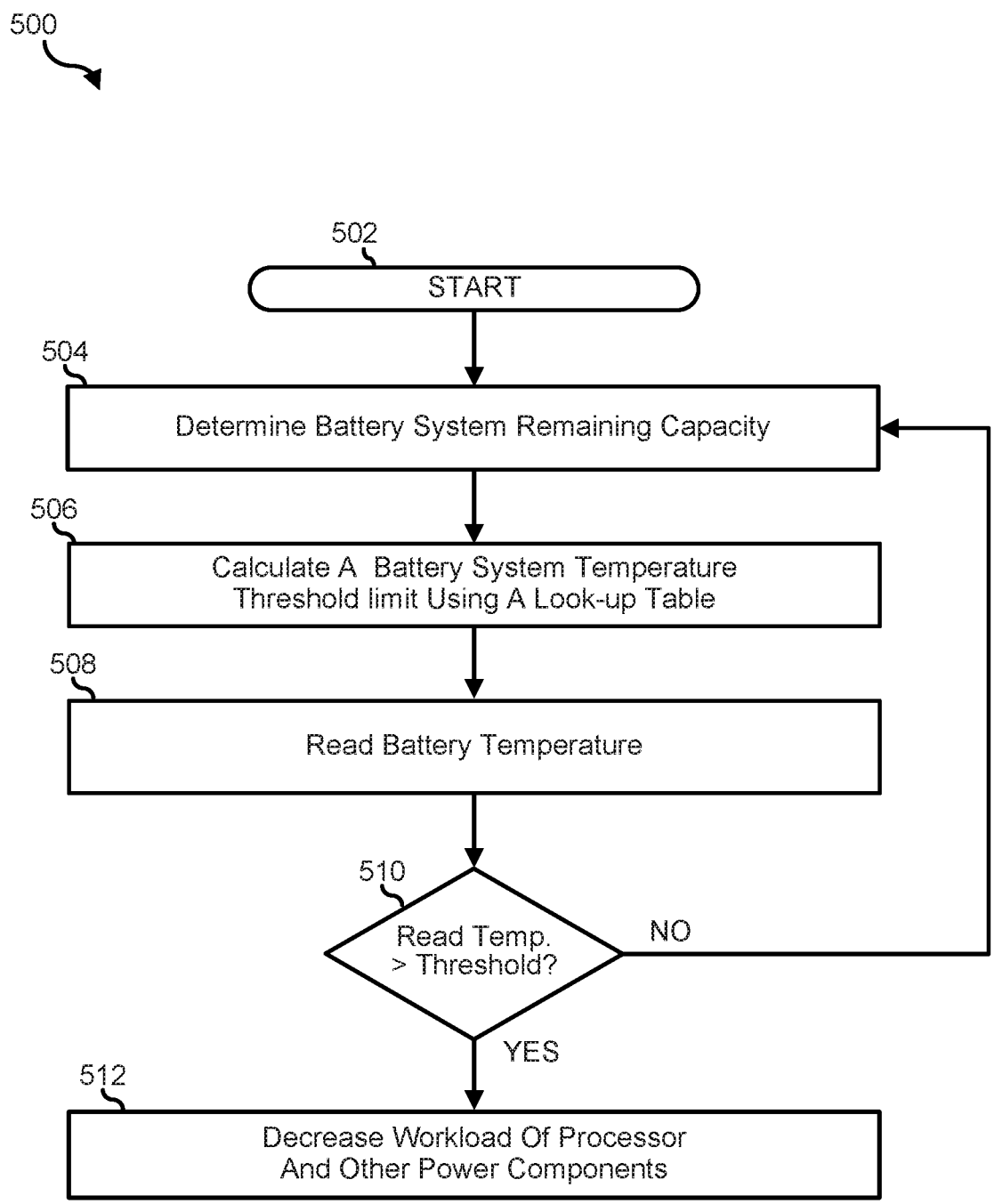
FIG. 5 is a flow chart showing a method of adjusting a processor workload based upon a read battery temperature, according to an embodiment of the present disclosure.

FIG. 5 is a flow chart 500 showing a method of adjusting processor workload based upon the read battery temperature, starting at block 502. At block 504, determining the battery capacity range 410 is performed. For example, the battery capacity range 410 includes the remaining capacity of the battery system 250 at a particular time period. In this example and at block 506, the EC 190 utilizes the look-up table 400 to calculate the battery system temperature threshold limit 450. For example and for the first range 411, the battery system temperature threshold limit 450 includes the first battery temperature threshold limit 451 of 55° C. In another example, the battery system temperature threshold limit 450 includes the second battery temperature threshold limit 452 of 58° C.

At block 508, reading the battery temperature 460 is performed. For example, the BMU 260 reads the battery temperature from the battery temperature register 272. In this example and at block 510, the read battery temperature is compared with the corresponding battery system temperature threshold limit 450. In case the read battery temperature is higher than the corresponding battery system temperature threshold limit 450, then at block 512, the processor 102 may receive power limit recommendations from the EC 190. The processor 102 may use the received power limit recommendations to decrease, for example, the workload 202. The resulting changes in power consumption by the processor 102 may generate adjustments in the discharging rates of the battery system 250. In other embodiments, other power components of the information handling system that form part of the system load may receive the power limit recommendations from the EC 190.

In an embodiment and when platform environment control interface (PECI) power limit one (PL1) is used in the power management, the EC 190 may send the power limit recommendation request to the processor 102 in order to decrease the processor power consumption by 1 Watt per step. In this embodiment, the PECI PL1 is a thermal management standard that is introduced in controlling the power consumption in the processors.

In a case where the read battery temperature is less than the corresponding battery system temperature threshold limit 450, the determining of the battery system remaining capacity is performed again at block 504

Figure 6:
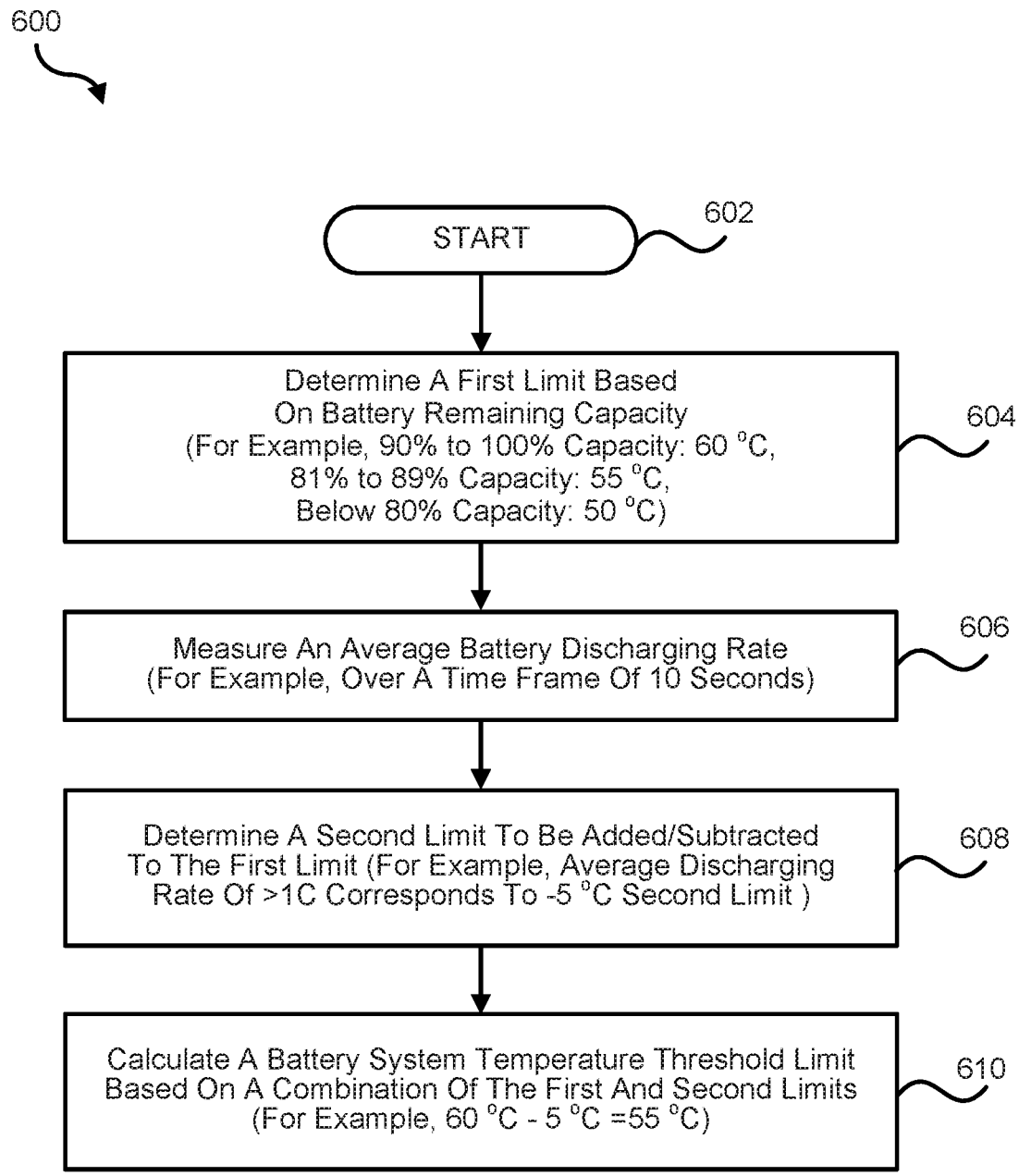
FIG. 6 is a flow chart showing a method of determining the battery temperature threshold, according to an embodiment of the present disclosure.

FIG. 6 is a flow chart 600 showing a method of determining the battery system temperature threshold limit 450, starting at block 602. At block 604, determining a first limit that is based upon a remaining capacity of the battery system is performed. For example and for the first range 411, the first limit 420 is 60° C. In this example and at block 606, the average discharging rate over a particular time period is measured. For example, the average discharging rate 430 is measured over a period of ten seconds. With the determined average discharging rate 430, a second limit is determined at block 608. For example, for the calculated average discharging rate that is greater than 1C, a corresponding second limit 440 of −5° C. is to be added to the 60° C. first limit 420. In this example and at block 610, calculating the battery system temperature threshold limit is performed by adding the first limit to the second limit. For example, the first limit 420 of 60° C. is added to the second limit 440 of −5° C. to generate the first battery system threshold limit 452 of 55° C.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having improved power management, comprising:
    a processor;
    an embedded controller (EC) coupled to the processor; and
    a battery system coupled to the processor and to the EC, wherein the EC sends a request to the processor based upon a temperature of the battery system, upon a current battery capacity of the battery system, and upon battery cycles of the battery system, wherein the processor adjusts a workload based upon the received request, wherein the adjustment in the workload generates a change in a battery discharging rate from a first battery discharging rate to a second battery discharging rate, wherein the change in the battery discharging rate increases a number of charging cycles available in the battery system.

2. The information handling system of claim 1, wherein the EC includes a baseboard management controller.

3. The information handling system of claim 1, wherein the request includes a power limit recommendation.

4. The information handling system of claim 1, wherein the EC sends the request when the temperature exceeds a battery system temperature threshold limit.

5. The information handling system of claim 4, wherein the EC utilizes a look-up table to determine the battery system temperature threshold limit.

6. The information handling system of claim 5, wherein the look-up table includes a battery capacity range, a first limit, an average discharging rate, a second limit, and a calculated battery system temperature threshold limit.

7. The information handling system of claim 5, wherein the battery system temperature threshold limit is calculated by adding the first limit and the second limit.

8. The information handling system of claim 5, wherein the second limit includes a preconfigured equivalent value that corresponds to a particular average discharging rate.

9. The information handling system of claim 1, wherein the request includes a decrease in the workload to decrease the battery discharging rates.

10. An information handling system, comprising:
    an embedded controller (EC); and
    limit recommendation based upon a temperature of the battery system, upon a current battery capacity of the battery system, and upon battery cycles of the battery system, wherein the power limit recommendation facilitates adjustment in a system load of the information handling system, wherein the adjustment in the workload generates a change in a battery discharging rate from a first battery discharging rate to a second battery discharging rate, wherein the change in the battery discharging rate increases a number of charging cycles available in the battery system.

11. The information handling system of claim 10, wherein the EC sends the power limit recommendation when the temperature exceeds a battery system temperature threshold limit.

12. The information handling system of claim 11, wherein the EC utilizes the look-up table to determine the battery system temperature threshold limit.

13. The information handling system of claim 10, wherein the look-up table includes a battery capacity range, a first limit, an average discharging rate, a second limit, and a calculated battery system temperature threshold limit.

14. The information handling system of claim 13, wherein the battery system temperature threshold limit is calculated by adding the first limit and the second limit.

15. The information handling system of claim 14, wherein the second limit includes a preconfigured equivalent value that corresponds to a particular average discharging rate.

16. A method, comprising:
    calculating, by an embedded controller, of a battery system temperature threshold limit;
    reading a battery temperature;
    comparing the read battery temperature to the battery system temperature threshold limit;
    sending a power limit recommendation to a processor based upon the read battery temperature, upon a current battery capacity of the battery system, and upon battery cycles of the battery system, wherein the processor adjusts a workload based upon the received power limit recommendation, wherein the adjustment in the workload decreases a discharging rate of the battery system, from a first battery discharging rate to a second battery discharging rate, wherein the change in the battery discharging rate increases a number of charging cycles available in the battery system.

17. The method of claim 16, wherein a look-up table is used to calculate the battery system temperature threshold limit.

18. The method of claim 16, wherein the look-up table includes a first limit and a second limit that are added together to calculate the battery system temperature threshold limit.

* * * * *